MANUFACTURE OF CRYSTAL CONTACT DEVICES

INVENTORS
RONALD GORDON POWER
GEORGE MAYES WELLS

BY
[signature]
ATTORNEY

INVENTORS
RONALD GORDON POWER
GEORGE MAYES WELLS
BY
[signature]
ATTORNEY

Nov. 4, 1958 R. G. POWER ET AL 2,858,598

MANUFACTURE OF CRYSTAL CONTACT DEVICES

Filed April 7, 1954 3 Sheets-Sheet 3

INVENTORS
RONALD GORDON POWER
GEORGE MAYES WELLS
BY
[signature]
ATTORNEY 2,858,598
Patented Nov. 4, 1958

2,858,598

MANUFACTURE OF CRYSTAL CONTACT DEVICES

Ronald Gordon Power, Croxley Green, and George Mayes Wells, Bedford Park, London, England, assignors to The General Electric Company Limited, London, England Application April 7, 1954, Serial No. 421,574

Claims priority, application Great Britain April 14, 1953

4 Claims. (Cl. 29—25.3)

This invention relates to the manufacture of crystal contact devices.

The invention is concerned in particular with the manufacture of crystal contact devices of the kind comprising a plurality of closely spaced contact members each making point contact with a semiconducting crystalline element. In such devices, for example crystal triodes, it is usually important that the spacings between the various contact points should be accurately fixed, and it is therefore an object of the present invention to provide a method of preparing a contact assembly for a crystal contact device of the kind specified by means of which this requirement may be met.

According to the present invention there is provided a method of preparing a contact assembly for a crystal contact device of the kind specified, the contact assembly comprising a support member on which is mounted a plurality of metallic members electrically insulated from each other, and a plurality of contact members each in the form of a wire having a straight portion which is pointed at one end and a portion offset from the longitudinal axis of said straight portion, the wires being secured to different ones of said metallic members in positions such that the straight portions of all the wires extend in substantially the same direction with their pointed ends in close proximity, the method including the following operations in respect of each wire: bringing the wire into a position in which its straight portion is disposed in the desired spatial relationship with the support member and its offset portion is in contact with the appropriate metallic member, and then securing the offset portion of the wire to the metallic member while holding the wire in said position, the wire being held so that it is relatively free for rotation about the longitudinal axis of its straight portion and so that the only reaction exerted upon it by the metallic member is directed along a line perpendicular to, but not intersecting, said axis.

Two arrangements in accordance with the invention will now be described by way of example with reference to the accompanying diagrammatic drawings, in which Figure 1 is a perspective view of one form of crystal triode;

Figures 1, 2:
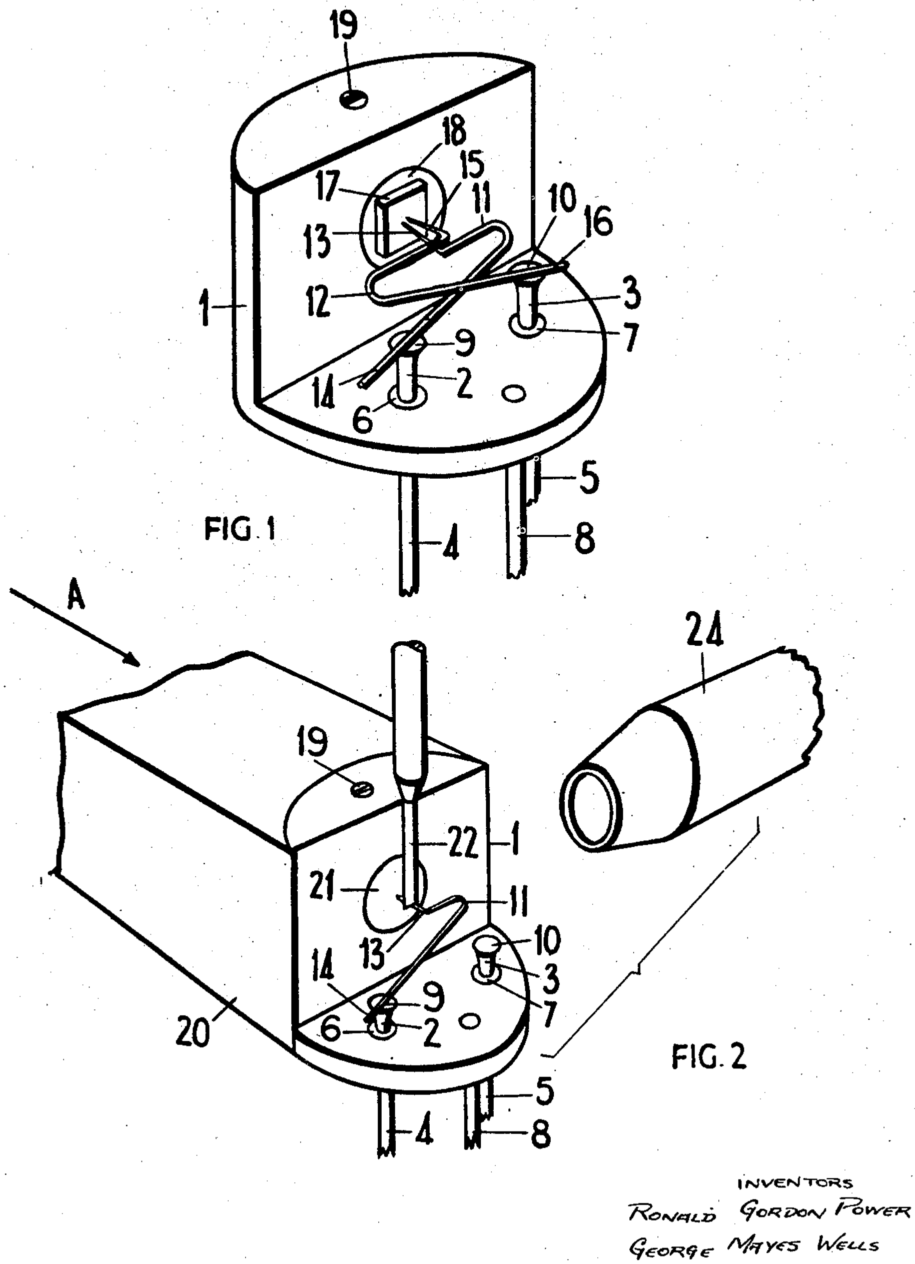
Figure 2 illustrates a stage in the manufacture of the crystal triode shown in Figure 1.

Referring to Figure 1, the first crystal triode includes a brass support member 1 which is formed from a cylindrical block by cutting away part of the block. Mounted on the support member 1 are two metal tubes 2 and 3 which are welded on to wires 4 and 5 respectively which serve as leads, the wires 4 and 5 passing through holes in the support member 1 and being insulated from it by glass eyelets 6 and 7 sealed to the wires 4 and 5 respectively and cemented in the holes in the support member 1. A third wire 8 is secured in a further hole in the support member 1 to serve as another lead. The open ends of the tubes 2 and 3 are filled with masses of solder 9 and 10 which serve to secure two contact members in the form of fine wires 11 and 12. The wire 11 includes a straight portion 13 pointed at one end and a portion 14 offset from the longitudinal axis of the straight portion 13; similarly the wire 12 includes a straight portion 15 pointed at one end and a portion 16 offset from the longitudinal axis of the straight portion 15. The straight portions 13 and 15 extend in substantially the same direction with their pointed ends in close proximity and in contact with a small block of germanium 17 which is soldered to one end of a metal cylinder 18 secured in a hole in the support member 1 by means of a setscrew 19.

Figure 3:
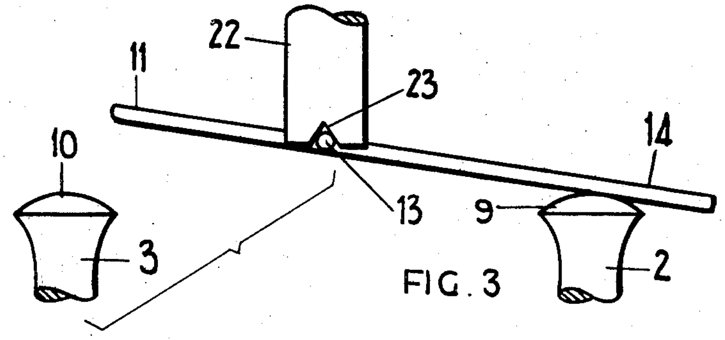
Figure 3 shows a detal of the arrangement shown in Figure 2, viewed in the direction A indicated in Figure 2.

Referring now to Figures 2 and 3, during the manufacture of the crystal triode the support member 1, with the tubes 2 and 3 and lead wires 4, 5 and 8 mounted in position, is held on the end of a horizontally disposed arm 20, the end of the arm 20 being hollowed to receive the support member 1 and being provided with a spigot 21 which passes through the hole in the support member 1 which later receives the metal cylinder 18, the support member 1 being held firmly in position by tightening the setscrew 19 against the spigot 21. Disposed adjacent to the end of the arm 20 is an open-ended tube 22 which extends substantially vertically and is connected to a suitable vacuum supply (not shown). The tube 22 is utilised for holding the wires 11 and 12 while they are secured in position, in a manner which will now be described in more detail with respect to the wire 11. The wire 11 is placed with its straight portion 13 extending substantially horizontal in a groove 23 formed on the open end of the tube 22, so that the wire 11 is held by suction against the end of the tube 22 in such a manner that it is relatively free for rotation about the longitudinal axis of the straight portion 13. The wire 11 is originally disposed so that the offset portion 14 lies above the end of the tube 2, and is brought into its desired position relative to the support member 1 by moving the tube 22, first horizontally in the vertical plane in which the longitudinal axis of the straight portion 13 lies, and then vertically downwards in this plane. The movements of the pointed end of the straight portion 13 are observed by means of a microscope 24 in order to ensure accurate control of the positioning of the wire 11. The vertical movement of the tube 22 is arranged so that the offset portion 14 comes into contact with the solder 9 before the vertical movement is completed, so that the wire 11 is caused to rotate about the longitudinal axis of the straight portion 13 during the rest of the vertical movement by virtue of the reaction exerted on it by the solder 9.. When the wire 11 has finally been brought into the desired position with the offset portion 14 in contact with the solder 9, the wire 11 is secured in position by melting and then resolidifying the solder 9; the heating of the solder 9 may be conveniently carried out by bringing into contact with the tube 2 a wire (not shown) heated by passing an electric current through it.

After the wire 11 has been secured in position, it is released from the end of the tube 22 by shutting off the vacuum supply, and a similar procedure is then carried out in respect of the wire 12. In order to ensure that the wires 11 and 12 do not accidentally come into contact, it may be desirable to rotate the tube 22 through a small angle in the vertical plane in which lies the longitudinal axis of the straight portion 13 of the wire 11, before the wire 12 is placed on the end of the tube 22, so that the straight portions 13 and 15 will eventually converge towards their pointed ends at a small angle.

After the wires 11 and 12 have both been secured in position, the contact assembly thus produced is removed from the arm 20, and the crystal triode is completed by advancing the metal cylinder 18 through the hole in the support member 1 until the germanium block 17 is in contact with the pointed ends of the wires 11 and 12; if desired, the contact pressure between the wires 11 and 12 and the germanium block 17 may be increased by a further advance of the metal cylinder 18 after contact is made, and when the desired adjustment has been achieved the metal cylinder 18 is fixed in position by tightening the setscrew 19. The crystal triode is then completed as shown in Figure 1, and is preferably then mounted in a protective container (not shown) through which the lead wires 4, 5 and 8 are arranged to project.

Figure 4:
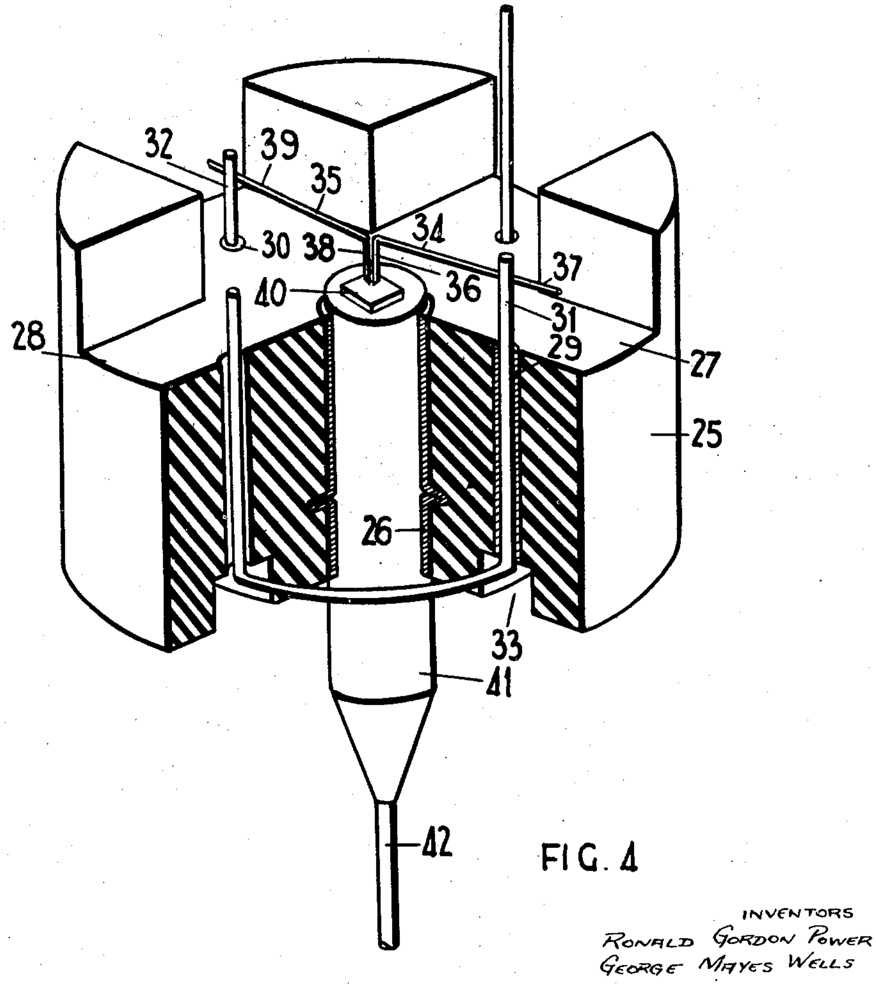
Figure 4 is a perspective view of a second form of crystal triode, partly cut away to show internal details.

Turning now to Figure 4, the second crystal triode includes a circular cylindrical support member 25 which is moulded from a suitable insulating material, an axially disposed tubular metal member 26 being rigidly fixed in the support member 25 during the moulding process. The support member 25 is moulded so that there are formed across one end two perpendicular diametral channels 27 and 28 of rectangular cross-section, and so that the support member 25 has formed in it four symmetrically disposed holes extending parallel to its axis and opening at opposite ends of the channels 27 and 28. In the two holes opening into the channel 27 are cemented metal tubes 29 and 30 in which are respectively soldered copper wires 31 and 32, the wires 31 and 32 projecting for short distances into the channel 27. The wires 31 and 32 pass through a circular groove 33 formed in the end of the support member 25 opposite the channelled end, and then through the holes opening into the channel 28 so as to project beyond the channelled end of the support member 25 and serve as leads to the crystal triode. Soldered to the wires 31 and 32 are two contact members in the form of fine L-shaped wires 34 and 35 respectively. The wire 34 has a straight portion 36 which is pointed at one end and a portion 37 offset from the longitudinal axis of the straight portion 36; similarly the wire 35 has a straight portion 38 pointed at one end and a portion 39 offset from the longitudinal axis of the straight portion 38. The straight portions 36 and 38 extend in substantially the same direction with their pointed ends in close proximity and in contact with a small block of germanium 40 which is soldered on to the end of a metal cylinder 41 soldered into the tubular member 26. A wire 42 is formed integral with the metal cylinder 41 to serve as a further lead to the crystal triode.

Figure 5:
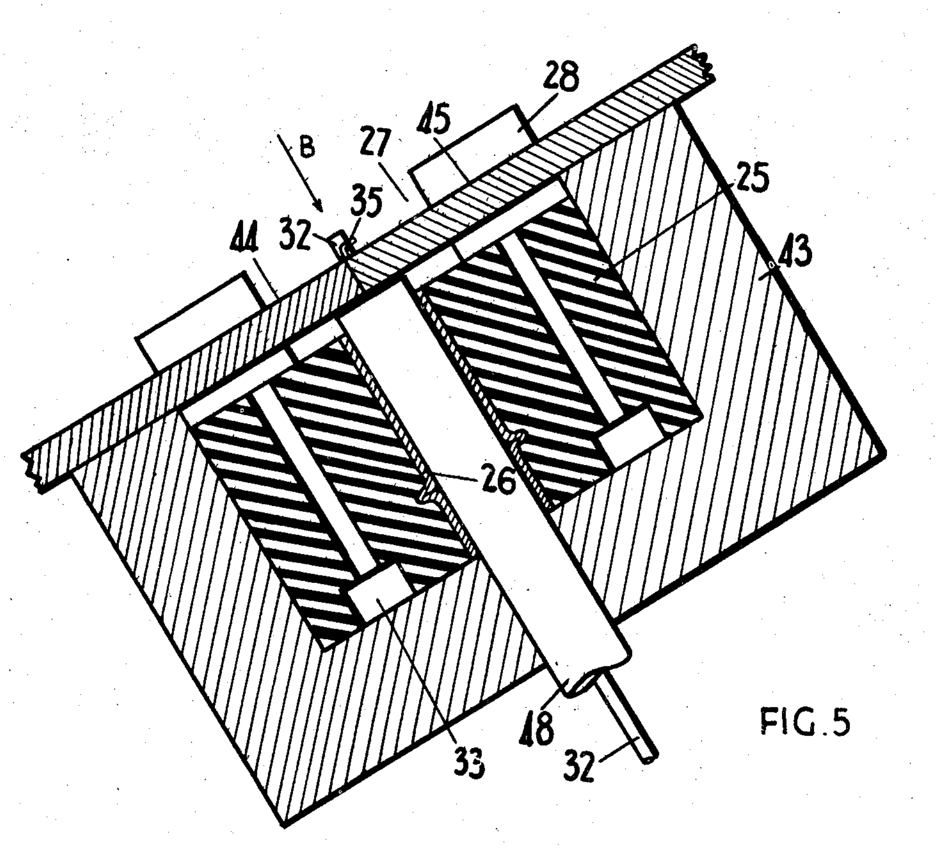
Figure 5 is a sectional view illustrating a stage in the manufacture of the crystal triode shown in Figure 4.
Figure 6:
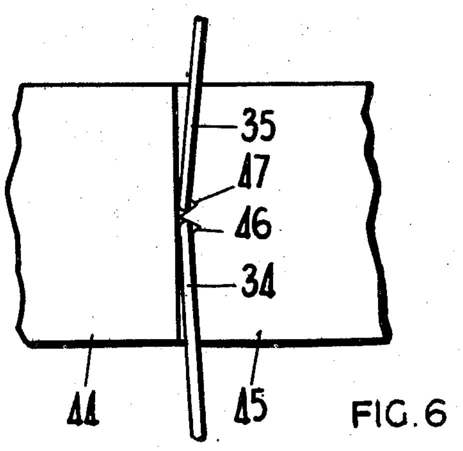
Figure 6 shows detail of the arrangement shown in Figure 5, viewed in the direction B indicated in Figure 5.

Referring now to Figures 5 and 6, during the manufacture of the crystal triode, the support member 25, with the wires 31 and 32 mounted in position but with their ends projecting beyond the grooved end of the support member 25 instead of being threaded through the holes opening into the channel 28, is mounted in a jig in which it is held in a circular cylindrical well in a metal base plate 43, the support member 25 being correctly located with respect to its angular position in the well by threading the long projecting ends of the wires 31 and 32 through two holes formed in the base plate 43 and opening at the base of the well. The support member 25 is held in the jig with its axis inclined to the horizontal at an angle of approximately 45° with the channelled end uppermost. The jig also includes a pair of metal jaws 44 and 45 mounted above the base plate 43 and arranged to open and close by motion along the channel 28. The jaws 44 and 45 have opposing plane surfaces disposed perpendicular to the line of motion of the jaws 44 and 45, and the plane surface of the jaw 45 has formed in it two notches 46 and 47 extending parallel to the axis of the mounted support member 25 and disposed close together so that when the jaws 44 and 45 are closed the notches 46 and 47 are aligned with the interior of the tubular member 26. With the jaws 44 and 45 closed the straight portions 36 and 38 of the wires 34 and 35 are threaded through the notches 46 and 47 respectively so that the points project into the space formed by the intersection of the channels 27 and 28; in order to facilitate insertion of the wires 34 and 35, the upper ends of the notches 46 and 47 may be slightly flared. The notches 46 and 47 are so formed that the wires 34 and 35 are relatively free for rotation about the longitudinal axes of their respective straight portions 36 and 38, while being incapable of movement in a direction perpendicular to these axes. The wires 34 and 35 are inserted in the notches 46 and 47 with their offset portions 37 and 39 respectively disposed above the parts of the wires 31 and 32 which project into the channel 27, and after they are inserted the wires 34 and 35 rotate about the longitudinal axes of their respective straight portions 36 and 38 under the influence of gravity until the offset portions 37 and 39 come into contact with the respective wires 31 and 32. A metal spigot 48 forming part of the jig is then advanced upwards through the tubular member 26 until its upper end is brought into contact with the points of both the wires 34 and 35; by this means the points of the two wires 34 and 35 are accurately aligned in a plane perpendicular to the longitudinal axes of their straight portions 36 and 38, without the necessity for rquiring very close tolerances of the lengths of the straight portions 36 and 38. The offset portions 37 and 39 of the wires 34 and 35 are then soldered to the corresponding wires 31 and 32 with which they are in contact, and the contact assembly thus produced is removed from the jig.

The manufacture of the crystal triode is completed as follows. The metal cylinder 41 is advanced through the tubular member 26 until the germanium block 40 is in contact with the points of the wires 34 and 35; if desired, the contact pressure between the wires 34 and 35 and the germanium block 40 may be increased by a further advance of the metal cylinder 41 after contact is made, and when the desired adjustment has been achieved the metal cylinder 41 is fixed in position by soldering it to the tubular member 26. The long free ends of the wires 31 and 32 are doubled back round the groove 33 and threaded through the holes opening into the channel 28. The crystal triode is then completed as shown in Figure 4 and is then preferably mounted in a protective container (not shown) through which the leads are arranged to project.

It will be appreciated that in both the arrangements described above each contact wire, while being secured in position, is held so that it is relatively free for rotation about the longitudinal axis of its straight portion and so that the only reaction exerted upon it by the metallic member to which it is to be secured is directed along a line perpendicular to, but not intersecting, that axis. By virtue of these facts the contact wires will be substantially strain free when they have been secured in position, and will therefore not exhibit any appreciable tendency to alter their respective positions when they are released. It will therefore be seen that the spacing between the points of the two contact wires will be very accurately fixed in each case.

While the invention has been described above with reference to two embodiments in which the crystal contact device has only two contact members making point contact with the crystalline element, it is to be understood that the invention is equally applicable in the case of crystal contact devices including more than two such contact members.

We claim:

1. A method of preparing a contact assembly for a crystal contact device, the contact assembly comprising a support member on which is mounted a plurality of metallic members electrically insulated from each other, and a plurality of contact members each in the form of a wire having a straight portion which is pointed at one end and a portion offset from the longitudinal axis of said straight portion, the wires being secured to different ones of said metallic members in positions such that the straight portions of all the wires extend in substantially the same direction with their pointed ends in close proximity, the method including the following operations in respect of each wire: bringing the wire into a position in which its straight portion is disposed in the desired spatial relationship with the support member and its offset portion is in contact with the appropriate metallic member with the only reaction exerted upon the wire by the metallic member directed along a line perpendicular to, but not intersecting, the longitudinal axis of the straight portion, holding the wire in said position with the wire relatively free for rotation about said axis, and securing the offset portion of the wire to the metallic member while holding the wire in this manner.

2. A method according to claim 1, in which the wire, while being brought into position, is subjected to a movement perpendicular to the longitudinal axis of its straight portion which is such that the offset portion of the wire comes into contact with the metallic member before said movement is completed, the wire being caused to rotate about said axis during the rest of said movement by virtue of the reaction exerted on it by the metallic member.

3. A method according to claim 1, in which the wire, while being brought into position, is disposed with the longitudinal axis of its straight portion in the desired alignment relative to the support member, and is then caused to rotate about said axis to bring its offset portion into contact with the metallic member.

4. A method of manufacturing a crystal contact device, including the steps of preparing a contact assembly by a method according to claim 1, bringing a semiconducting crystalline element into contact with the pointed ends of all the wires by advancing it in the direction of the straight portions of the wires, and then securing the element in position on the support member.

References Cited in the file of this patent

UNITED STATES PATENTS

| | | |
|---|---|---|
| 2,538,593 | Rose | Jan. 16, 1951 |
| 2,609,427 | Stelmak | Sept. 2, 1952 |
| 2,675,509 | Barton | Apr. 13, 1954 |
| 2,704,340 | Baird | Mar. 15, 1955 |